United States Patent
Oroskar et al.

(10) Patent No.: US 8,649,807 B1
(45) Date of Patent: Feb. 11, 2014

(54) PAGING SCHEME SETTINGS OF SWITCH BASED ON LIKELIHOOD OF ROAMING

(75) Inventors: Siddharth S. Oroskar, Overland Park, KS (US); Srikanth Pulugurta, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 597 days.

(21) Appl. No.: 12/854,119

(22) Filed: Aug. 10, 2010

(51) Int. Cl.
*H04W 68/00* (2009.01)
*H04W 4/00* (2009.01)

(52) U.S. Cl.
USPC ............ 455/458; 455/432.1; 455/432.2; 455/432.3; 455/435.1; 455/436; 455/439; 455/440

(58) Field of Classification Search
USPC ........ 455/432.1–432.3, 435.1, 436, 439, 440, 455/458
See application file for complete search history.

(56) References Cited

U.S. PATENT DOCUMENTS

| | | | |
|---|---|---|---|
| 5,153,902 A * | 10/1992 | Buhl et al. ................. | 455/432.1 |
| 5,369,681 A | 11/1994 | Boudreau et al. | |
| 5,960,356 A * | 9/1999 | Alperovich et al. .......... | 455/458 |
| 6,035,203 A * | 3/2000 | Hanson ......................... | 455/458 |
| 6,058,308 A * | 5/2000 | Kallin et al. ................. | 455/432.3 |
| 6,108,518 A * | 8/2000 | Madour et al. ................ | 455/458 |
| 6,181,945 B1 | 1/2001 | Lee | |
| 6,223,042 B1 | 4/2001 | Raffel | |
| 6,253,078 B1 * | 6/2001 | Lee ................................ | 455/458 |
| 6,393,285 B1 * | 5/2002 | Stephens .................... | 455/435.1 |
| 6,477,382 B1 * | 11/2002 | Mansfield et al. ........... | 455/458 |
| 6,643,520 B1 | 11/2003 | Park et al. | |
| 6,745,039 B1 | 6/2004 | Di Lalla | |
| 6,922,561 B2 | 7/2005 | Chen et al. | |
| 6,963,750 B1 | 11/2005 | Cheng | |
| 7,062,270 B1 * | 6/2006 | Dalvie et al. ................. | 455/433 |
| 7,200,412 B2 * | 4/2007 | Kim ............................. | 455/458 |
| 7,366,526 B2 | 4/2008 | Zhang et al. | |
| 8,238,906 B1 * | 8/2012 | Oroskar et al. ............ | 455/432.1 |
| 8,364,175 B1 * | 1/2013 | Oroskar et al. .............. | 455/458 |
| 2007/0105535 A1 | 5/2007 | Jacobson et al. | |
| 2007/0293213 A1 * | 12/2007 | Papadimitriou et al. ... | 455/426.1 |
| 2008/0032713 A1 | 2/2008 | Yang | |
| 2008/0096520 A1 | 4/2008 | Benco et al. | |
| 2008/0293437 A1 | 11/2008 | Ranganathan et al. | |
| 2009/0042587 A1 * | 2/2009 | Kamdar et al. .............. | 455/458 |

(Continued)

OTHER PUBLICATIONS

Guang Wan, Eric Lin, A dynamic paging scheme for wireless communication systems, ACM/IEEE MOBICOM '97, pp. 195-203, 1997.*

(Continued)

*Primary Examiner* — Olumide T Ajibade Akonai

(57) ABSTRACT

Disclosed herein are methods and systems for adjusting the paging-scheme settings of a switch in an effort to reduce the likelihood that a wireless device roams from a preferred to a non-preferred coverage area. One exemplary method involves: (i) a switch in a radio access network (RAN) determining that a wireless communication device (WCD) should be paged, wherein the WCD is operating in a preferred coverage area; (ii) the switch determining a likelihood of roaming for the first WCD, wherein the likelihood of roaming indicates the likelihood that the first WCD will be handed off from the preferred coverage area to a non-preferred coverage area; (iii) based at least in part on the likelihood of roaming, the switch adjusting at least one paging-scheme setting affecting attempts to page the WCD; and (iv) paging the WCD according to the at least one adjusted paging-scheme setting.

19 Claims, 7 Drawing Sheets

(56) References Cited

U.S. PATENT DOCUMENTS

2009/0061854 A1 3/2009 Gillot et al.
2009/0247137 A1 10/2009 Awad
2009/0305666 A1* 12/2009 Tian et al. ................. 455/410
2010/0330996 A1* 12/2010 Svedevall et al. ............ 455/436

OTHER PUBLICATIONS

Unpublished U.S. Appl. No. 12/853,730, filed Aug. 10, 2010 entitled "Reducing the Usage of Non-Preferred Wireless Coverage Areas".
Unpublished U.S. Appl. No. 12/690,629, filed Jan. 20, 2010 entitled "Dynamic Paging Concatenation".
Unpublished U.S. Appl. No. 12/558,359, filed Sep. 11, 2009 entitled "Dynamic Paging Concatenation".
Unpublished U.S. Appl. No. 12/553,661, filed Sep. 3, 2009 entitled "Method and System for Paging a Mobile Station".
Unpublished U.S. Appl. No. 12/572,829, filed Oct. 2, 2009 entitled "Overflow Pages in Heavily Loaded Slots".
Unpublished U.S. Appl. No. 12/776,287, filed May 7, 2010 entitled "Dynamic Paging for Hybrid Mobile Stations".
Unpublished U.S. Appl. No. 12/786,174, filed May 24, 2010 entitled "Dynamic Paging Concatenation Based on Page-Type".
Unpublished U.S. Appl. No. 12/756,027, filed Apr. 7, 2010 entitled "Paging Power Control Based on Page Concatenation".
Unpublished U.S. Appl. No. 12/786,184, filed May 24, 2010 entitled "Dynamic Adjustment of Paging Power Based on Page-Type".
Unpublished U.S. Appl. No. 12/854,114, filed Aug. 10, 2010 entitled "Dynamic Paging Concatenation Based on the Likelihood of Roaming".
Unpublished U.S. Appl. No. 12/261,229, filed Oct. 30, 2008 entitled "Method and System of Roaming".

* cited by examiner

Fig. 6

| WCD IDENTIFIER | RECENT VISITS (CALLS) | RECENT VISITS (CALLS) RESULTING IN RAPID HANDOFF TO A NON-PREFERRED WIRELESS COVERAGE AREA | PERCENTAGE |
|---|---|---|---|
| 312-555-1000 | 5 | 0 | 0% |
| 312-555-1001 | 14 | 7 | 50% |
| 312-555-1002 | 80 | 8 | 10% |
| 312-555-1003 | 3 | 3 | 100% |

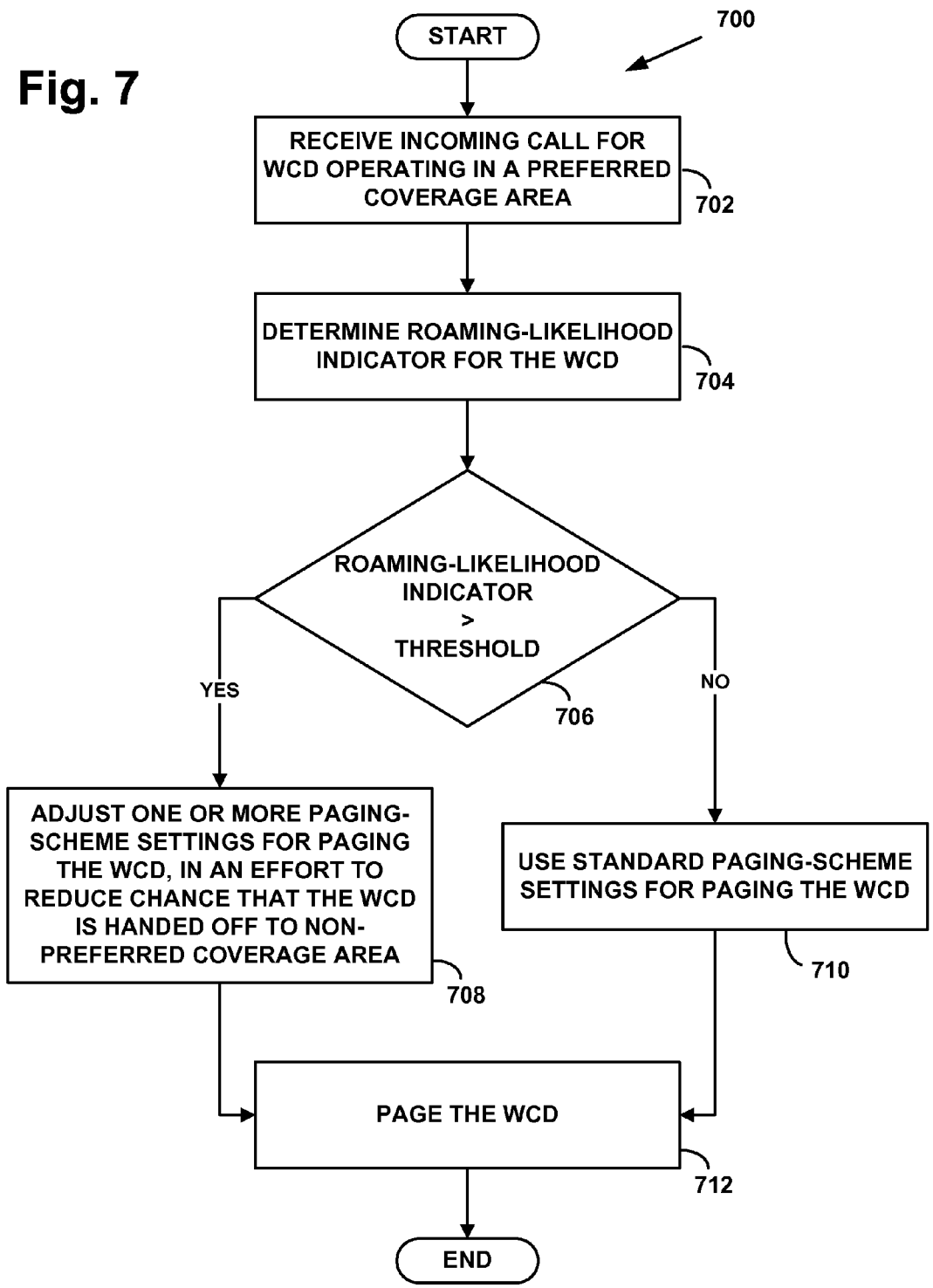

US 8,649,807 B1

PAGING SCHEME SETTINGS OF SWITCH BASED ON LIKELIHOOD OF ROAMING

BACKGROUND

To provide cellular wireless communication service, a wireless service provider or "wireless carrier" typically operates a radio access network (RAN) that defines one or more coverage areas in which WCDs can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

When a RAN receives an incoming communication for a WCD, the RAN typically pages the WCD via a paging channel in at least the coverage area in which the WCD last registered. When a cellular wireless communication system seeks to page a WCD (e.g., for an incoming call or for some other reason), a switch in the network may send the page message to numerous base stations in the switch's coverage area, with the hope that when the base stations broadcast the page message, the WCD will receive the page message in one of the associated sectors, and will respond. Further, a switch may be configured to re-send a page in the event that a given attempt to page a WCD fails.

Wireless service providers typically design their wireless networks to comprise a number of partially-overlapping wireless coverage areas. As a WCD that is subscribed to a wireless service provider moves about, the wireless network may hand off the WCD from one wireless coverage area to another. A goal of performing such handoffs is to provide a substantially continuous wireless coverage to the WCD, so that any communication sessions conducted by the WCD are not dropped or degraded due to loss of wireless coverage.

However, it is not economically feasible for any given wireless service provider to deploy perfect wireless coverage. Thus, wireless service providers often partner with other wireless service providers to form roaming agreements. According to these roaming agreements, when a wireless service provider cannot provide reasonable wireless coverage to a WCD, the WCD may instead be served by one of the wireless service provider's roaming partners. Consequently, the roaming partner provides wireless service for the WCD for a period of time, typically until the wireless service provider can once again provide a reasonable wireless coverage to a WCD.

OVERVIEW

While roaming agreements may result in a better overall wireless coverage for WCDs, and therefore a better experience for WCD users, there are drawbacks to letting a WCD roam. One such drawback is that, while roaming, the WCD may not have access to applications and services offered by the wireless service provider. Another drawback to roaming is that the roaming partner may charge the wireless service provider a fee for each unit of time, unit of data, or transaction that the roaming partner serves a roaming WCD. Other drawbacks may also exist.

According to embodiments herein, a radio access network (RAN), and in particular, a switch in the RAN, may be able to determine when one or more of its subscribed WCDs is likely to roam from a coverage area operated by the service provider for the WCD, to a coverage area served by another service provider. The switch may then proactively take steps to reduce the likelihood of this roaming by adjusting paging-scheme settings at the switch.

In exemplary embodiments, the wireless service provider may operate and/or control a RAN that provides a preferred wireless coverage area to serve WCDs. The wireless service provider may categorize wireless coverage areas that the wireless service provider operates and/or controls as "preferred," while categorizing wireless coverage areas that the wireless service provider's roaming partners operate and/or control as "non-preferred." In order to avoid handing off a WCD to a non-preferred wireless coverage area, the wireless service provider may consider roaming data associated with the WCD when determining whether to take steps to decrease the likelihood of the handoff occurring. This roaming data may be, for instance, historical data representing the WCD's past handoff behavior.

More specifically, in exemplary embodiments, to reduce the likelihood of roaming (i.e., to reduce the likelihood of a handoff), a switch may adjust one or more paging-scheme settings that affect the probability that a WCD will successfully receive a page. Doing so may increase the likelihood that a WCD connects via the preferred coverage area, rather than in a non-preferred coverage area. For example, the switch may adjust one or more paging-scheme settings in order to, for example: (i) page a WCD in multiple paging zones (and possibly system-wide) in the first attempt page the WCD (rather than initially sending the page only in the zone in which a WCD is registered), (ii) enable intersystem paging for the first attempt to page a WCD, rather than waiting until the second or third attempt, (iii) increase the maximum number of attempts that can be made to page a WCD, and/or (iv) decrease the period between attempts to page a WCD (thus increasing the frequency of subsequent attempts, when necessary).

In one aspect, an exemplary method involves: (i) a switch in a RAN determining that a WCD should be paged, wherein the WCD is operating in a preferred coverage area; (ii) the switch determining a likelihood of roaming for the first WCD, wherein the likelihood of roaming indicates the likelihood that the first WCD will be handed off from the preferred coverage area to a non-preferred coverage area; (iii) based at least in part on the likelihood of roaming, the switch adjusting at least one paging-scheme setting affecting attempts to page the WCD; and (iv) paging the WCD according to the at least one adjusted paging-scheme setting.

In another aspect, an exemplary system includes: (i) a non-transitory tangible computer-readable medium; and (ii) program instructions stored in the computer-readable medium that are executable by at least one processor to: (a) determine that a switch in a radio access network (RAN) should page a wireless communication device (WCD), wherein the WCD is operating in a preferred coverage area of the RAN; (b) determine a likelihood of roaming for the first WCD, wherein the likelihood of roaming indicates the likelihood that the first WCD will be handed off from the preferred coverage area to a non-preferred coverage area; (c) based at least in part on the likelihood of roaming, adjust at least one paging-scheme setting that affects attempts to page the WCD by the switch; and (d) cause the switch to page the WCD according to the at least one adjusted paging-scheme setting.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 6 is a table illustrating exemplary roaming data, which may be incorporated in an exemplary embodiment; and FIG. 7 is another flow chart illustrating a method according to an exemplary embodiment.

DETAILED DESCRIPTION

Exemplary embodiments of the present invention are described herein. Employing various embodiments of the present invention, a wireless service provider may be able to, in some cases, avoid the usage of non-preferred wireless coverage by its subscribed wireless communication devices (WCDs). In turn, this may reduce the roaming fees that the wireless service provider is charged by other wireless service providers (e.g., roaming partners).

It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

It should be noted that the term "handoff" is to be interpreted broadly herein. Thus, a WCD being "handed off" from a preferred wireless coverage area to a non-preferred wireless coverage area may include scenarios in which (i) the WCD is participating in communication via the preferred wireless coverage area when the handoff occurs, (ii) the WCD is not participating in communication via the preferred wireless coverage area when the handoff occurs, and (iii) the WCD engages in a first call via a preferred wireless coverage area, the first call is terminated, and soon after the WCD engages in a second call via a non-preferred wireless coverage area.

I. Network Architecture

Figure 1:
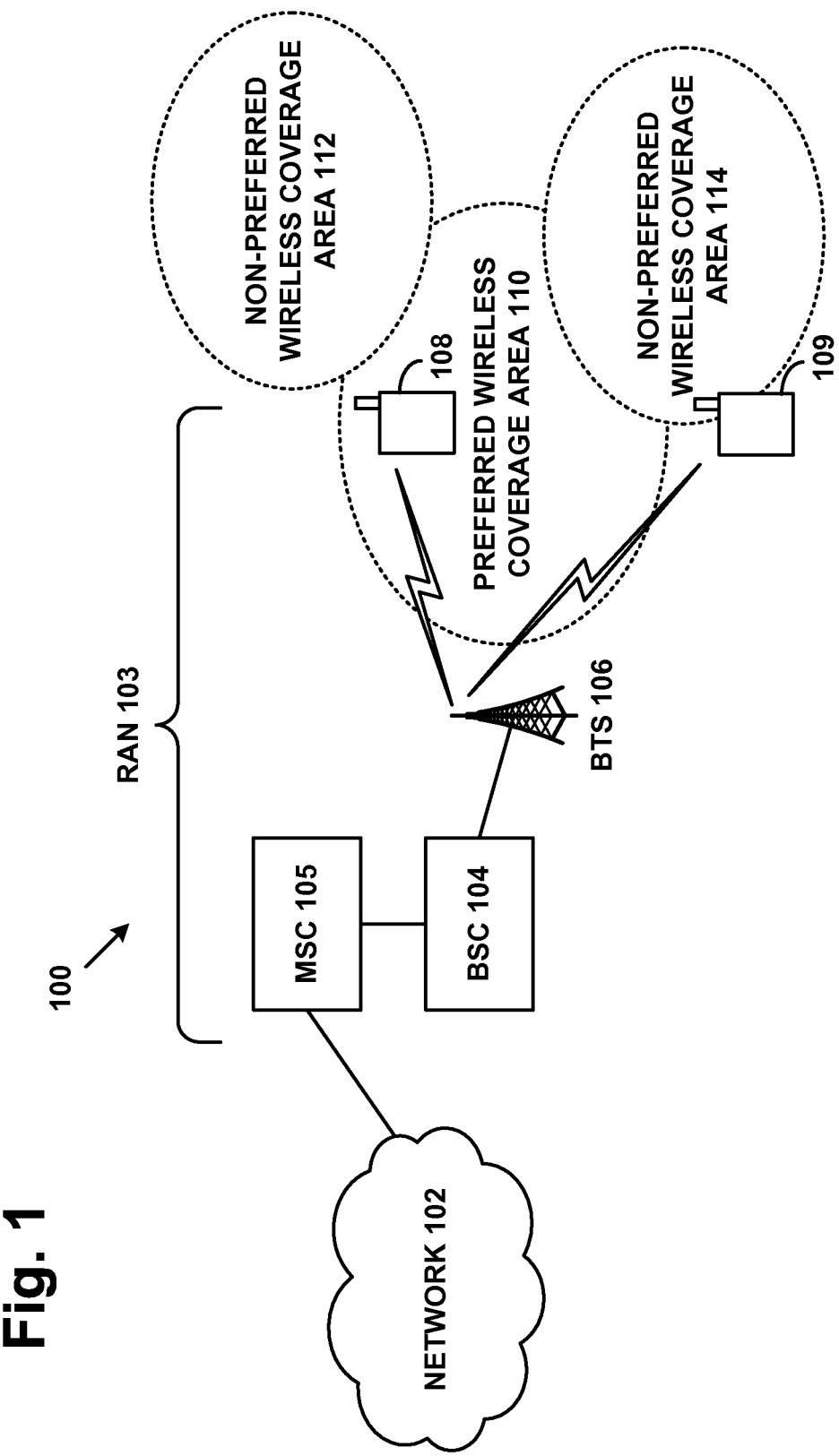
FIG. 1 depicts an exemplary communication system in which exemplary embodiments can be carried out or deployed.

FIG. 1 depicts an exemplary communication system 100 in which the embodiments herein can be carried out or deployed. At a high level, communication system 100 comprises a network 102, a RAN 103, a preferred wireless coverage area 110, and non-preferred wireless coverage areas 112 and 114. Any of the wireless coverage areas may provide wireless communication services to WCD 108 and/or WCD 109.

Network 102 is preferably a packet-switched and/or circuit-switched communication network that links RAN 103 to other networks, devices, applications, and/or services. Network 102 may be, for instance, the Internet, a private IP network, the public-switched telephone network (PSTN) or a private circuit-switched network. Network 102 may comprise one or more switches, gateways, routers, signaling nodes, application servers, and/or other types of devices, systems and networks. In one possible embodiment, network 102 includes both packet-switching and circuit-switching capabilities.

RAN 103 may include a base station controller (BSC) 104, a mobile switching center (MSC) 105, a base transceiver station (BTS) 106, and other RAN components. However, for sake of simplicity, FIG. 1 excludes some of these components, such as softswitches, media gateways, media gateway controllers, signaling nodes, authentication servers, registration servers, and so on. Furthermore, throughout this description, the term "RAN component" may be used to refer to a BTS, an BSC, a combination of one or more BTSs and an BSC, or any other type of component used for RAN functionality.

BTS 106 may radiate on one or more frequencies to define preferred wireless coverage area 110. Preferred wireless coverage area 110, may, in turn, serve WCD 108 and/or WCD 109. To supply wireless service to these WCDs, as well as other WCDs, preferred wireless coverage area 110 may include an air interface that comprises one or more forward link and/or reverse link channels. Through the forward and reverse link channels, BTS 106 and WCD 108 and/or WCD 109 may exchange signaling and bearer traffic.

In one possible embodiment, these channels may be formed via a set of orthogonal Code Division Multiple Access (CDMA) codes, each of which may be used to modulate the data transmitted on a particular channel. However, other embodiments using different technologies are also possible. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi). Thus, RAN 103 may operate according to one or more of CDMA, any of these other technologies, and/or additional technologies now known or developed in the future.

The forward link channels, which carry data from BTS 106 to WCD 108 and from BTS 106 to WCD 109, may include a pilot channel, over which a phase offset pattern is repeatedly transmitted, a sync channel over which synchronization data, such as a timing reference, is transmitted, and traffic channels over which bearer traffic directed to WCD 108 and/or WCD 109 is transmitted. Additionally, one or more of the forward link channels may be designated as primary and/or secondary paging channels, and may be used for contacting WCDs.

The reverse link channels, which carry data from WCDs 108 and 109 to BTS 106, may also be formed through the use of CDMA or other technologies. These reverse link channels may include, for example, an access channel for responding to paging messages and for initiating communications, and reverse traffic channels for transmitting bearer traffic from WCD 108 to BTS 106 and from WCD 109 to BTS 106.

BSC 104 may perform a variety of tasks, including management of the wireless resources associated with BTS 106, and routing of traffic to and from BTS 106. Further, BSC 104 may be able to facilitate handoff of WCD 108 and/or WCD 109 from one wireless coverage area to another (e.g., between preferred wireless coverage area 110 and one of the non-preferred wireless coverage areas). BSC 104 may be communicatively coupled to network 102 either directly or via one or more links or other devices. For instance, BSC 104 may communicate with network 102 via MSC 105 or via an access gateway (not shown), such as a packet data serving node (PDSN) or an access serving network gateway (ASN-GW).

MSC 105 may perform many of the functions of a Class 5 telephony switch, but with additional functionality to manage the mobility of subscriber devices, such as WCD 108 and 109. For example, MSC 105 may comprise or be communicatively coupled with a visitor location register (VLR) and a home location register (HLR). MSC 105 may be responsible for switching functions, media transport functions, transcoding functions, short message service (SMS) functions, and managing the communications between WCDs and any the circuit switched functions of network 102 or other networks.

Furthermore, MSC 105 may track subscriber usage to facilitate billing and performance monitoring. To do so, for each call that the MSC 105 handles, MSC 105 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). MSC 105 may transmit these CDRs to a central entity that maintains a database in which the CDRs are compiled. It should be understood that RAN components other than MSCs may generate CDRs in addition to or instead of MSC 105 generating CDRs.

WCD 108 and WCD 109 may be two of potentially many WCDs being provided service in preferred wireless coverage area 110. Such WCDs could be a wireless telephone, a wireless personal digital assistant, a wirelessly equipped laptop computer, a wireless router, or another type of mobile or fixed wireless device. Preferably, a WCD is a subscriber device that is manipulated by a human in order to establish and engage in circuit-switched or packet-switched voice and/or data calls. However, a WCD could also be an automated device without a human interface.

A WCD may be associated with zero or more RANs at a time and may use the wireless coverage areas of these RANs to communicate, via network 102, with correspondent nodes, such as web servers, gaming servers, short message service (SMS) servers, signaling and media nodes, other WCDs, and other communication devices (e.g., wireline phones). Further, a WCD may be in communication with one or more preferred and/or non-preferred wireless coverage areas simultaneously, even if the WCD is only using one of these wireless coverage areas to communicate with the correspondent nodes.

Receiving signals from multiple wireless coverage areas simultaneously may provide advantages for a WCD. For instance, doing so allows the WCD to keep track of neighboring wireless coverage areas that are candidates for a handoff. Regularly, or from time to time, the WCD may measure the strength of the signals received from each wireless coverage area. These signals may be received on a traffic channel, a paging channel, or some other type of channel, and the measurements may involve determining the signal-to-noise ratio (SNR) and/or the frame error rate (FER) of the signals. When a WCD is served by a given wireless coverage area and determines that the signal strength the WCD received from this given wireless coverage area has dropped below a signal-strength threshold, the WCD may request a handoff from the given wireless coverage area to a new wireless coverage area from which the WCD has received a higher signal strength. The WCD may also request a handoff to a new wireless coverage area when the received signal strength of the new wireless coverage area exceeds that of the given wireless coverage area by some amount. As a result of measuring this received signal strength and using these measurements to influence handoff behavior, handoffs may be faster and less disruptive. For instance, the WCD may be handed off from the given wireless coverage area before it experiences a poor signal strength from the given wireless coverage area that substantially compromises the WCD's ability to communicate.

Preferred wireless coverage area 110 may be defined by BTS 106 radiating on one or more frequencies. Similarly, BTSs that are under the control of other entities may radiate on one or more frequencies to define non-preferred wireless coverage areas 112 and 114. The frequencies used to define each of these wireless coverage areas may be non-overlapping in order to reduce interference. Alternatively, the frequencies used by these wireless coverage areas may overlap with one another to some extent.

Although three wireless coverage areas are shown in FIG. 1, the embodiments herein may make use of more or fewer wireless coverage areas. For example, RAN 103 may radiate to define more than one preferred wireless coverage area. Similarly, there may be only one or more than two non-preferred wireless coverage areas. While FIG. 1 depicts the physical coverage of preferred wireless coverage area 110 partially overlapping with that of non-preferred wireless coverage areas 112 and 114, preferred wireless coverage area 110 may overlap with these non-preferred wireless coverage areas more or less than is shown. Thus, for instance, preferred wireless coverage area 110 may fully overlap or not overlap at all with one or more of non-preferred wireless coverage areas 112 and 114.

It should be understood that FIG. 1 is presented merely for purposes of example, and that communication network 100 may comprise more or fewer components in different arrangements than shown. Further, each of these devices, such as BSC 104, MSC 105, and BTS 106, may include multiple physical or logical components arranged to operate in conjunction with one another. Alternatively or additionally, these devices may be able to be combined with one another into a smaller number of logical or physical devices. In sum, changes may be made to the arrangement illustrated by FIG. 1 without departing from the scope of the invention.

II. RAN Component Embodiment

Figure 2:
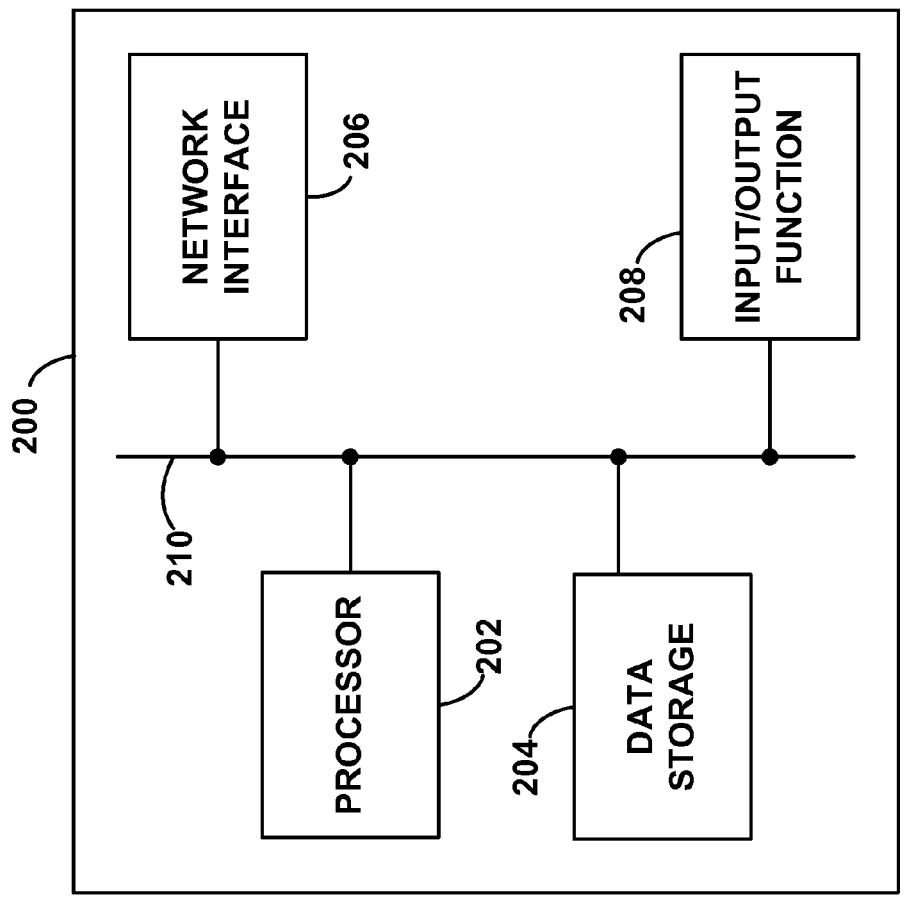
FIG. 2 is a simplified block diagram exemplifying a RAN component, according to an exemplary embodiment.

FIG. 2 is a simplified block diagram exemplifying a RAN component 200, and illustrating some of the functional components that would likely be found in a RAN component arranged to operate in accordance with the embodiments herein. Example RAN component 200 could be any type of device found in or associated with a RAN, such as a BTS, an BSC, and/or an MSC.

Example RAN component 200 preferably includes a processor 202, a data storage 204, a network interface 206, and an input/output function 208, all of which may be coupled together by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.)

Data storage 204, in turn, may comprise volatile and/or non-volatile memory and can be integrated in whole or in part with processor 202. Data storage 204 preferably holds program instructions, executable by processor 202, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example RAN component 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, example RAN component 200 may support remote access from another device, via network interface 206 or via another interface (not shown), such an RS-232 or USB port.

III. Paging Functionality

When a RAN seeks to communicate with a WCD (e.g., to establish an incoming voice call or transmit incoming packet data), the RAN may first page the WCD on a paging channel. The purpose of paging the WCD may be to determine whether the WCD is still within range of a preferred wireless coverage area, and if so, to notify the WCD of the incoming communication. If the WCD is successfully paged, the RAN may assign one or more traffic channels to WCD.

Preferably, a paging channel comprises one or more of the forward links supported by the preferred wireless coverage area. The paging channel may operate in a slotted manner, according to time-division multiplexing (TDM), and multiple WCDs may be grouped together and assigned to the same paging channel slot. Each paging channel slot is typically divided into four frames, each of which comprises two half-frames, resulting in a total of eight half-frames per paging channel slot. In a given paging channel slot, the RAN preferably transmits one or more general paging messages (GPMs), each containing information sufficient to identify which WCD or WCDs of the group (if any) are being paged. Thus, a WCD served by the preferred wireless coverage area may periodically listen to its assigned paging channel slot to determine whether the RAN is seeking to page the WCD.

Paging is typically initiated when an MSC receives an indication that a WCD should be paged (e.g., an incoming call), or when the MSC itself determines that a WCD should be paged. The indication normally includes a WCD identifier, such as a Network Access Identifier (NAI), a Mobile Directory Number (MDN), a Mobile Identification Number (MIN), an International Mobile Subscriber Identifier (IMSI), an electronic serial number (ESN), and/or a mobile equipment identifier (MEID). The MSC may then transmit some representation of the indication to the appropriate BTS or BTSs. In turn, the BTS may use the WCD identifier to generate a page record, which the BTS may then place in a GPM for transmission to the WCD. (A GPM may also be referred to as a "page-request message" or just a "page.") The WCD may then reply with to the BTS with a page-response message (PRM) sent via a reverse-link access channel. After receiving the PRM and verifying the page was successfully received, the RAN may then assign one or more traffic channels to the WCD.

A metric of the paging effectiveness of a wireless coverage area is the wireless coverage area's paging success rate (PSR). The more often paging procedures in the wireless coverage area result in the successful paging of a WCD, the higher the PSR. PSR may be measured for a coverage area as a whole (i.e., the percentage of all GPMs in a given coverage area to which a WCD responds with a PRM). However, PSR may also be measured on a per-WCD basis (e.g., the percentage of GPMs to a particular WCD to which the WCD responds with a PRM), or on a per-WCD and per-coverage area basis (e.g., the percentage of GPMs to a particular WCD in a particular coverage area to which the WCD responds with a PRM), or in another manner altogether.

A. Resending Pages and Zone-Based Paging

In a further aspect of paging, a RAN will typically resend a page (and possibly do so a number of times) when a page fails to reach (or seemingly fails to reach) a WCD. More specifically, when a RAN does not receive a PRM from a WCD, the switch in the serving system (e.g., MSC 108) preferably attempts to re-page the WCD. In particular, an MSC 108 may wait a predetermined period of time (ten seconds, for instance) to receive an indication from a base station, which indicates a page response message has been received. If the MSC 108 does not receive such an indication, the MSC will resend the page to the base station to again be transmitted to the WCD. The MSC typically repeats this process until a page response message indicates that the page was successfully received, or until a maximum number of attempts has been made without receiving a PRM, and the page is deemed to have failed.

In an exemplary embodiment, a switch may have various paging-scheme settings that affect the manner in which the switch resends a page. In particular, the switch may define a "maximum-attempt" parameter, the value of which indicates the maximum number of attempts that can be made to send a given page. Further, the switch may track the "paging-attempt status" of a given page; which may also be referred to as the switch's "attempt count" for the page (i.e., how many attempts have been made by the switch to send the page). For example, an MSC may include, maintain, or have access to a database that tracks the paging-attempt status of pages initiated by the MSC. As such, when a page is successfully received at the intended WCD, and a PRM is received at the base station from which the page was sent, this may be relayed to the switch. The switch then knows not to initiate additional attempts to send the page and refrains from sending pages out to the base station from making additional attempts to send out the page. On the other hand, if the switch does not receive an indication that the page was successful from any base station, the switch will check the paging-attempt status, and if appropriate, send the page to one or more base stations for transmission in their respective coverage areas.

In addition, the switch may implement a "page-attempt timer," which the switch uses to determine when to make a subsequent paging attempt. Accordingly, if additional attempts to send the page are possible after the switch makes an attempt to send the page (i.e., if the attempt count for the page is less than the maximum-attempt value after the switch sends an indication to one or more base stations to page the WCD), the switch starts the page-attempt timer. Then, if no acknowledgement has been received from the WCD when the page-attempt timer expires, the switch initiates the next attempt to send the page.

In a further aspect, given the scarcity of paging channel resources in most modern cellular networks, paging across multiple sectors is typically implemented with a more-targeted paging process that is commonly referred to as "zone-based paging." With zone-based paging, a cellular network is divided into paging zones, each with a respective zone ID, and paging is performed on a zone-basis. To facilitate this, each base station (e.g., BTS 106) in the system may broadcast as one of its overhead parameters the zone ID for the zone in which the base station is located. A WCD 108 operating in the network may then programmatically monitor the zone IDs indicated in the overhead messages and may automatically register with the network when they detect that they have moved into a new zone, or for other reasons. With this process, the registration records thereby maintained by switches and/or home location registers will indicate the paging zone in which each WCD last registered.

When a switch (e.g., MSC 105) seeks to page a WCD, the switch may then efficiently send the page message to just those base stations that are within the zone of the WCD's last registration, as it is likely that the WCD is in that zone. Further, the switch may send the page message to the base stations in zones adjacent to the WCD's zone of last registration, to cover the possibility that the WCD has moved to a new zone but has not yet registered its presence in the new zone.

Figure 3:
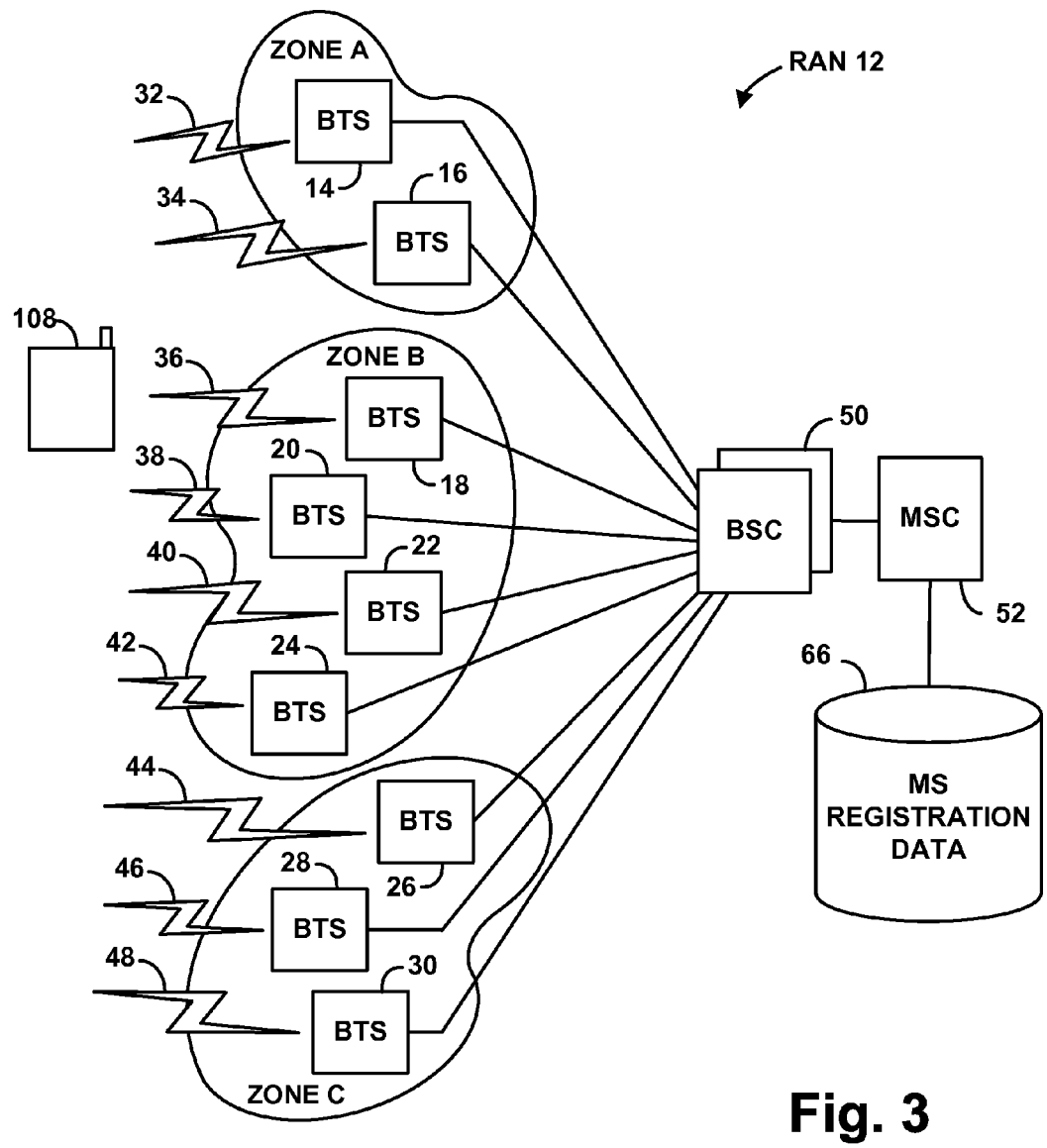
FIG. 3 is a block diagram illustrating a portion of a coverage area of radio access network in which exemplary embodiments can be carried out or deployed.

FIG. 3 is a block diagram illustrating a portion of a coverage area of radio access network 12, which is divided into paging zones according to a zone-based paging scheme. As shown, the base stations 14-30 are grouped into zones A, B, and C to facilitate zone-based paging as described above. In particular, each base station may broadcast a zone ID indicating its zone, and a WCD such as WCD 102 may monitor the zone IDs broadcast in the coverage areas where the WCD is operating. When the WCD detects a change in zone ID, the WCD may then responsively register its presence in the new zone, so that the RAN would then know to page the WCD in that new zone.

In an exemplary embodiment, zones are defined by MSCs (i.e., zone IDs are created, base stations are assigned to a particular zone ID, etc.). For instance, MSC 52 may create zone IDs corresponding to each zone A-C, and assign base stations 14-16 to zone A, base stations 18-24 to zone B, and base stations 26-30 to zone C. It should be understood, however, that other network entities may define paging zones, in combination with or instead of MSC 52, without departing from the scope of the invention.

As shown, MSC 52 also includes or has access to WCD registration data 66. The WCD registration data 66 preferably comprises data that specifies per WCD where the WCD is currently registered, such as the zone in which the WCD is currently registered, among possibly other information. In an exemplary embodiment, the WCD registration data may take the form of a visitor location register (VLR) database, which holds a record per WCD in the MSC's service area. The WCD's current zone of registration can thus be indicated in the WCD's VLR record. Alternatively or additionally, the WCD registration data can take the form of a home location register (HLR) database that is accessible via the MSC 52. Still alternatively, the data may be stored internally at the MSC and/or base stations, or elsewhere in some other form.

Using the general paging strategy that is implemented in many RANs providing IS-2000 and/or EVDO service, a RAN makes up to three attempts to page a WCD. In particular, the MSC 52 may initiate a first attempt by sending a page to one or more base stations for transmission in the paging zone B in which the WCD is registered (i.e., the base stations in the paging zone in which the WCD is registered transmit the page record). Then, if the first attempt is unsuccessful (e.g., the WCD does not acknowledge the page), the MSC initiates a second attempt by again sending the page record to the one or more base stations for transmission in the paging zone B in which the WCD is registered, and typically to one or more additional base stations for transmission in one or more adjacent zones (e.g., zones A and C) as well. If the second attempt also fails, then the MSC initiates a third attempt to page the WCD, which typically involves sending the page record to multiple base stations for a system-wide transmission of the page record (i.e., in all paging zones within the coverage area of the switch), although it is possible that a third attempt may be of a different scope as well. Furthermore, it should be understood that an exemplary embodiment may also be implemented in a RAN that does not implement zone-based paging, without departing from the scope of the invention.

B. Intersystem Paging

Figure 4:
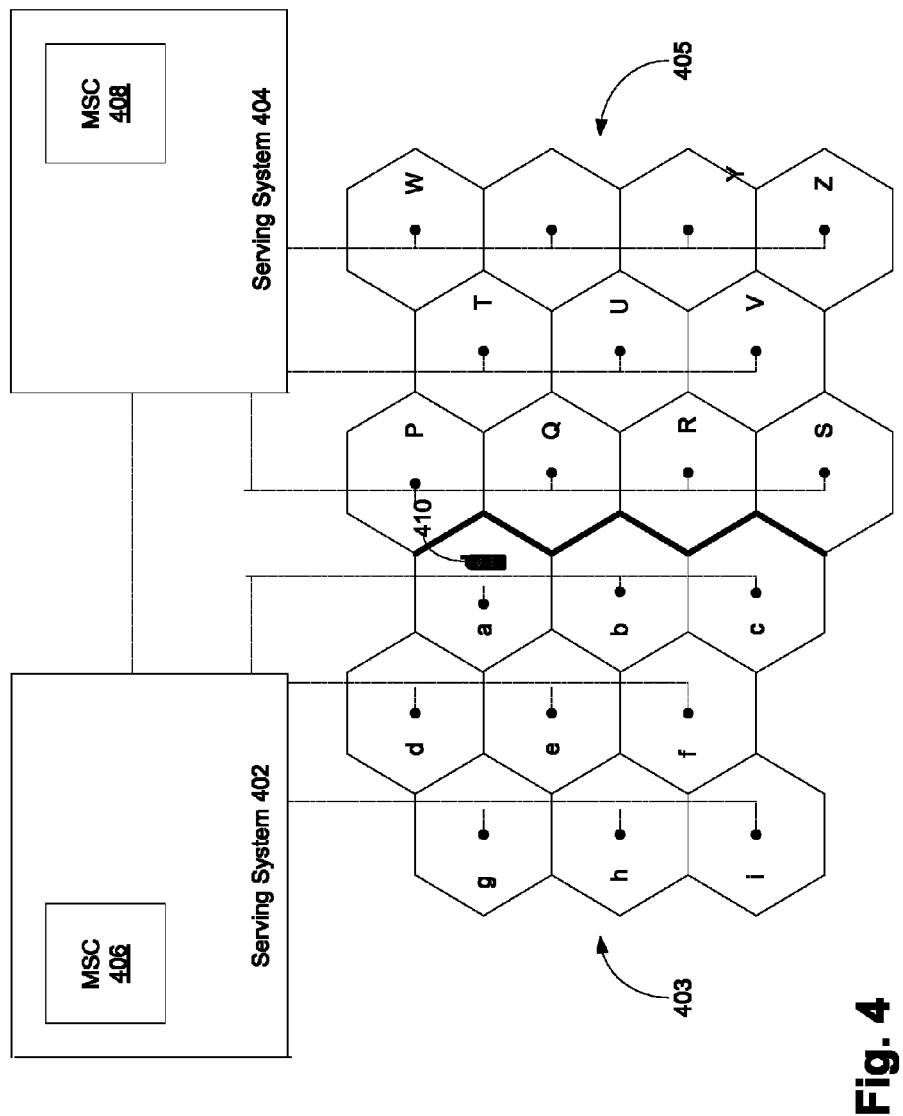
FIG. 4 is another block diagram illustrating a portion of a coverage area of radio access network in which exemplary embodiments can be carried out or deployed.

In a further aspect, a RAN may also be configured for "intersystem paging" (which may also be referred to as "border cell paging" or "BCP"). Intersystem paging settings specify how a WCD should be paged when the WCD is located at or near a border between serving systems (each serving system including a switch and its corresponding base stations) in a RAN's coverage. FIG. 4 is a block diagram illustrating a portion of the coverage area in an exemplary RAN, which includes two systems 402 and 404 serving coverage areas 403 and 405, respectively. In an exemplary embodiment, each system 402 and 404 is controlled by a respective MSC 406 and 408. Each system 402 and 404 provides service in a number of sectors that are served by the respective MSC (via one or more base stations (not shown)). In particular, MSC 406 serves sectors a-i, which collectively may be referred to as coverage area 403, and MSC 408 serves sectors P-Z, which collectively may be referred to as coverage area 405. In coverage area 403, sectors a-c, which are located at the border of the paging zones, are considered to be border sectors, and collectively are considered a border zone within system 402. Similarly, in coverage area 405, sectors P-S are considered to be border sectors, and collectively are considered a border zone within system 404.

When a WCD is located in a border zone, the serving MSC may be configured to send a page locally (i.e., in the sector or zone in which a mobile is registered), and to additionally send the page to the MSC serving the bordering system. Therefore, the WCD can also be paged in the bordering system, which may improve service in the event that the WCD has traveled into the coverage area of the bordering system since it last registered. Accordingly, if the WCD responds to a page from the serving system, then call setup proceeds normally. If, on the other hand, the WCD responds to a page from the bordering system, the call may be transferred to the bordering system.

For example, when a call arrives for a WCD 410 registered in system 402, the serving MSC 406 may determine if the WCD was last registered in a border zone (i.e., if the sector in which the WCD last registered is a border sector). If the WCD 410 is not registered in a border zone, then the MSC 406 proceeds to page the WCD as it otherwise would (i.e., sends a page in the sector in which the WCD is registered, and possibly neighboring sectors as well). In the illustrated scenario, however, the WCD 410 is registered in sector a, which is in the border zone of system 402. Therefore, in addition to sending the page in sector a (and possibly nearby sectors as well), the MSC 406 sends an "intersystem" page to the MSC 408 serving the bordering system 404. MSC 408 may then send the intersystem page to WCD 410 in its border zone, which includes sectors P-S (via the base station or base stations serving these sectors). If the WCD 410 responds to a page from system 402, then the call proceeds normally. If, on the other hand, the WCD 410 responds to a page from system 404, the call may be transferred to system 404.

In an exemplary embodiment, intersystem paging may be implemented using ISPAGE2 functionality, as defined by the ANSI-41 protocol (which is also referred to as IS-41). As such, intersystem pages may be relayed between systems (i.e., between MSCs) using ISPAGE2 messaging, as specified in ANSI-41. ISPAGE2 and ANSI-41 are well known in the art, and thus not described in detail herein. Further, it should be understood that the term "intersystem page", as used herein, may include any page that sent by an MSC other than the MSC serving the zone in which a given WCD is registered. As such, an MSC may identify any page it receives from another MSC, or any page it sends to another MSC, as an intersystem page.

In an exemplary embodiment, a switch may have various paging-scheme settings that affect the manner in which the intersystem paging is implemented. For example, an exemplary MSC 406 may be configured to adjust the attempt count at which intersystem paging is enabled. For example, an MSC 406 may adjust settings for intersystem paging such that intersystem paging is not enabled until the second or third attempt to send a given page, or may adjust the settings such that intersystem paging is enabled for all attempts to send the page. An exemplary MSC 406 may define other settings for intersystem paging, which may also affect the manner in which intersystem paging is implemented.

C. Service-Provider Roaming Agreements

In an exemplary embodiment, a preferred coverage area may be a coverage area served by a subscriber's own service provider, while a non-preferred coverage area may be a coverage area served by another service provider. For instance, turning back to FIG. 1, WCD 108 and WCD 109 may be subscribed to the wireless service provider that controls and/or operates preferred wireless coverage area 110. (This wireless service provider may also be referred to as the "home wireless service provider.") One way in which the preferred status for a given coverage area may be established is that a user of one of these WCDs may purchase or lease their WCD from the service provider that provides service in that coverage area (i.e., the home wireless service provider for the coverage area). Then, for pre-determined fees, the WCD may be used to communicate via any of the home wireless service provider's wireless coverage areas. Alternatively, a user of the WCD may purchase or lease the WCD from a third-party entity, such as a wholesaler or reseller, and then register the WCD for service with the home wireless service provider.

As noted above, it may not be feasible for any given wireless service provider to deploy perfect wireless coverage. Thus, wireless service providers often partner with other wireless service providers to form roaming agreements. According to these roaming agreements, when a wireless service provider cannot provide a reasonable wireless coverage to a WCD, the WCD may instead be served by one of the wireless service provider's roaming partners. Roaming partners may be wireless service providers in their own right, and therefore may also serve their own subscribed WCDs. A roaming partner may provide wireless service to the WCD for a period of time, typically until the wireless service provider can once again provide a reasonable wireless coverage to the WCD. In FIG. 1, non-preferred wireless coverage areas 112 and 114 may be controlled and/or operated by one or more roaming partners of the home wireless service provider.

It may be advantageous for the home wireless service provider to have one or more roaming partners, because allowing WCD 108 and/or WCD 109 to use these roaming partners' wireless service areas may increase the overall wireless coverage available to WCD 108 and/or WCD 109, thereby increasing customer satisfaction. However, roaming agreements between wireless service providers often involve an assessment of fees. For example, a roaming partner of the home wireless service provider may charge the home wireless service provider a fee when WCD 108 or WCD 109 uses one or more of the roaming partner's wireless coverage areas. Typically, no fees are charged if a roaming WCD is idle. But, if the roaming WCD makes a substantial use of the roaming partner's wireless coverage area(s), the home wireless service provider may be charged for that use. Such a substantial use might include, for example, making a voice or data call, or transmitting or receiving a text or multimedia message.

The fee for this use may be assessed on a per-time-unit basis, per-data-unit basis, per transaction basis, or some other basis. Thus, for example, if a WCD participated in a voice or data call while roaming, a fee may be assessed based on the number of minutes (or fractions of minutes) that the call lasted (e.g., three cents per minute). Alternatively, the fee may be assessed based on the amount of data transferred to and/or from the WCD during the course of the call (e.g., twenty-five cents per megabyte of data sent or received by the WCD). For some applications or services, such as text or multimedia messaging, fees may be assessed on a per-transaction basis (e.g., ten cents per text message).

While the home wireless service provider can pass on some or all of these roaming fees to the user of the WCD, doing so may lead to the user becoming frustrated with the home wireless service provider. Thus, it may be advantageous for the home wireless service provider to try to reduce the extent of roaming so that roaming fees are reduced. The effect of doing so may be lower costs paid by the home wireless service provider and/or users, ultimately resulting in higher user satisfaction with the home wireless service provider.

IV. Exemplary Methods and Systems

Exemplary methods and systems may be implemented by a switch to adjust paging-scheme settings based upon the likelihood of a WCD roaming, in an effort to prevent roaming (i.e., a handoff to a non-preferred coverage area). For example, an exemplary system may include program instructions stored on a tangible computer-readable medium that are executable to determine a roaming-likelihood indicator for a given WCD that is operating in a preferred coverage area, and based at least in part upon the roaming-likelihood indicator, adjust one or more paging-scheme settings at the switch. Preferably, when the roaming-likelihood indicator indicates that the WCD is likely to roam, the switch is configured to adjust paging-scheme settings in an effort to increase the probability that the WCD receives the page (e.g., by adjusting settings that tend to increase the PSR). Further, the system may take the form of a switch or other RAN component (such as that illustrated by RAN component 200 of FIG. 2), which includes data storage having such program instructions stored thereon.

Figure 5:
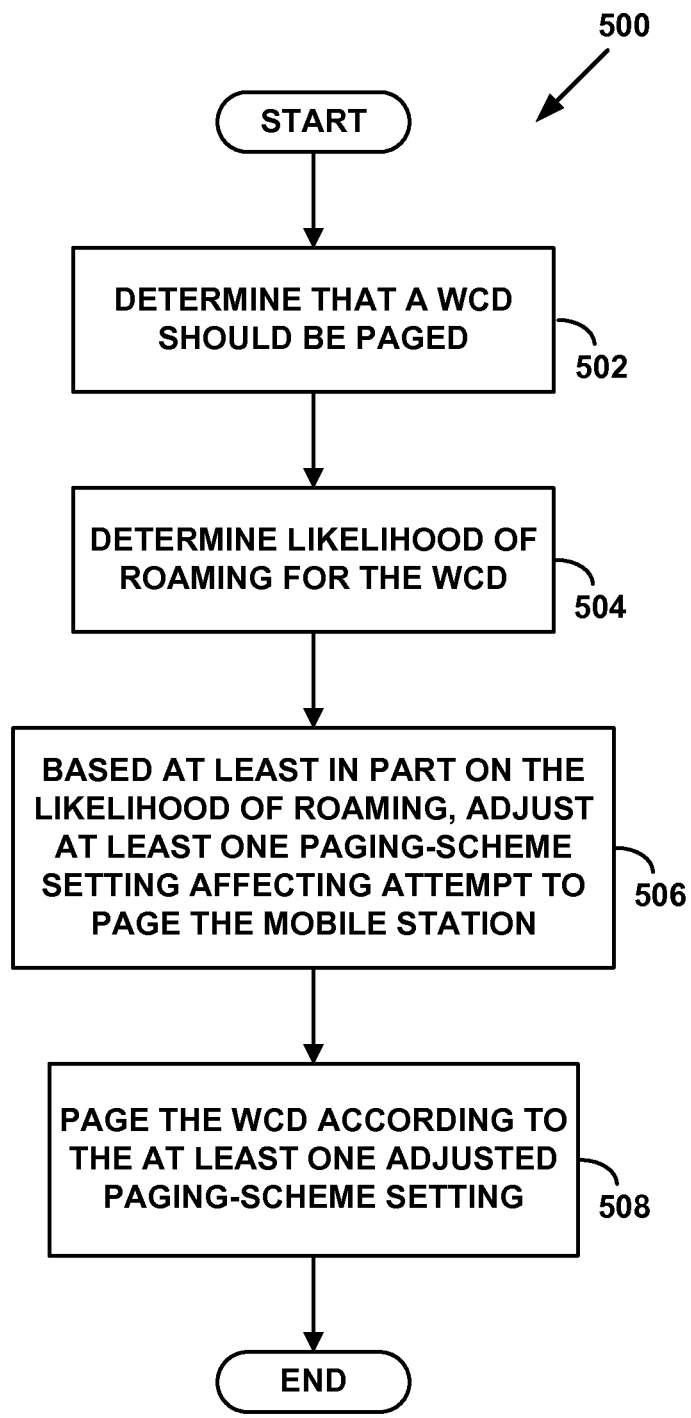
FIG. 5 is a flow chart illustrating a method according to an exemplary embodiment.

FIG. 5 is a flow chart illustrating a method 500 according to an exemplary embodiment. As shown, method 500 involves a switch determining that a WCD operating in a preferred coverage area should be paged, as shown by block 502. The switch then determines a likelihood of roaming for the WCD, as shown by block 504. The likelihood of roaming preferably indicates the likelihood that the first WCD will be handed off from the preferred coverage area to a non-preferred coverage area. Then, based at least in part on the likelihood of roaming, the switch adjusts at least one paging-scheme setting affecting attempts to page the WCD, as shown by block 506. The switch then pages the WCD according to the at least one adjusted paging-scheme setting, as shown by block 508.

A. Determining the Likelihood Roaming for a WCD

Referring back to FIG. 1, if WCD 108 has exhibited a tendency to roam from the preferred coverage area 110 in which the WCD is located, to an adjacent non-preferred wireless coverage area, then it may be likely that WCD 108 will do so again. For instance, suppose that WCD 108 has been served by preferred wireless coverage area 110 ten times in the last week. If, out of these ten occasions, WCD 108 roamed from preferred wireless coverage area 110 to non-preferred wireless coverage area 112 five times and to non-preferred wireless coverage area 114 two times, then WCD 108 has demonstrated a tendency to roam. In this case, 70% of the time that WCD 108 was served by preferred wireless coverage area 110, WCD 108 began roaming to a wireless coverage area of a roaming partner.

There are several possible reasons for why WCD 108 could exhibit this behavior. One reason may be that WCD 108 may have hardware, software, or mechanical characteristics that make it difficult for WCD 108 to transmit or receive properly on the frequency or frequencies used by preferred wireless coverage area 110. For example, WCD 108 might be a relatively old model with a transceiver that has deteriorated over time. Even if WCD 108 is not able to transmit or receive properly via preferred wireless coverage area 110, WCD 108 may be able to transmit and receive properly on other preferred or non-preferred wireless coverage areas. For instance, WCD 108 may be able to communicate with fewer problems when using the frequencies of non-preferred wireless coverage areas 112 and 114. In other words, communication problems that WCD 108 experiences in preferred wireless coverage area 110 may or may not occur in other wireless coverage areas.

Another possible reason for WCD 108 being handed off to a non-preferred wireless coverage area with some frequency could be the physical location in which WCD 108 is typically used. For instance, a user of WCD 108 may live, work, or spend a substantial amount of time near a border of preferred wireless coverage area 110. Due to this physical proximity to the border, the signal strength of preferred wireless coverage area 110 received by WCD 108 may be poor. Alternatively, the user of WCD 108 may spend a substantial amount of time in a physical location within the bounds of preferred wireless coverage area 110, but still receive a poor signal strength from this wireless coverage area. For example, this location could be a basement or the center of a large structure. As another example, the user of the WCD may simply be a highly mobile user, or may be highly mobile in a particular region. Under such conditions, WCD 108 may frequently roam to one of non-preferred wireless coverage areas 112 and 114. For any of these reasons, or for other reasons, the historical roaming data of a WCD, such as WCD 108, may indicate that the WCD is likely to roam from a preferred wireless coverage area to a non-preferred wireless coverage area again in the future.

In order to detect that a WCD 108 is likely to begin roaming, a RAN 103 may collect data regarding when the WCD engages in a handoff. To that end, there may be multiple ways through which the RAN 103 can learn that a WCD 108 has been handed off. For instance, during the handoff process, the WCD 108 may inform the RAN 103 (via BTS 106, BSC 104, and MSC 105) of the non-preferred wireless coverage area 112 to which the WCD is being handed off. Alternatively, the RAN 103 may receive, from the roaming partner that controls the non-preferred wireless coverage area 112, signaling messages indicating that the WCD has been handed off to the non-preferred wireless coverage area.

However, if the RAN 103 does not receive an explicit indication that the WCD 108 was handed off, the RAN may infer that a handoff occurred. For example, the WCD 108 may be taking part in a call via the preferred wireless coverage area 110. The RAN 103 may receive an indication that a call leg between the RAN 103 and the WCD 108 was terminated, and may record the time of the termination, as well as the caller, callee, an identifier of the preferred wireless coverage area, and related information. (It should be understood that a call leg is segment of a call between two endpoints. Thus, when the WCD 108 is handed off from a first BTS 106 to a second BTS, the WCD may maintain the end-to-end call, but replace the call leg between the WCD and the first BTS with a call leg between the WCD and the second BTS.) These records may take the form of CDRs.

At a later point in time (e.g., minutes, hours, or days after the call was terminated), the home wireless service provider may receive records of call legs and/or calls engaged in by the home wireless service provider's subscribed mobiles in roaming partners' wireless coverage areas. In an exemplary embodiment, the records may be formatted according to Transferred Account Procedure (TAP) or Cellular Intercarrier Billing Exchange Roamer (CIBER). Such records may comprise CDRs for each call or call leg made by a roaming WCD, including the WCD's location, the calling party, the called party, the time of the call, and the duration of the call. The home wireless service provider may accordingly implement systems that store such data provided by roaming partners. Further, such records may be sent directly from a roaming partner to the home service provider, or be relayed to the home service provider via a third party billing aggregator.

By correlating these received records with similar records recorded by the RAN 103, the home wireless service provider may be able to determine whether a WCD 108 that took part in a call via the preferred wireless coverage area 110 was rapidly handed off to a non-preferred wireless coverage area and took part in another call via the non-preferred wireless coverage area. For instance, the RAN 103 may compare the caller and callee of a terminated call leg that took place in the preferred wireless coverage area 110 to the caller and callee of call leg that subsequently took place in the non-preferred wireless coverage area 112. If the parties that took part in these calls are the same, this may indicate that the call was handed off from the preferred wireless coverage area 110 to the non-preferred wireless coverage area 112, or that the call was dropped during the course of such a handoff, and then reestablished via the non-preferred wireless coverage area. Regardless, if the time between the call being terminated in the preferred wireless coverage area and a corresponding call being initiated in the non-preferred wireless coverage area is below a threshold value, the RAN 103 may consider these events to be a "handoff."

In order to efficiently use such historical roaming data, the RAN may have access to information such as that in FIG. 6. Table 600 in FIG. 6 contains entries 602, 604, 606, and 608 of example data that could assist a RAN in performing this task. For each entry, table 600 stores a WCD identifier, a number of recent visits/calls, another number of recent visits/calls resulting in a rapid handoff to a non-preferred wireless coverage area, and a percentage.

A table like table 600 may be maintained for each preferred wireless coverage area. Further, a database storing data such as that of table 600 may be maintained by a service provider, or by a third party entity. Thus, the data may be maintained at an existing RAN component, at a standalone RAN component, or at a separate component to which the RAN has access. The information in table 600 may be presented or stored in other ways as well. As an alternative, the RAN may not have direct access to such a table, and may instead retrieve historical roaming data on an as-needed basis.

With respect to the contents of table 600, a WCD identifier may be a string of characters or bits that can be used to identify a WCD. As noted above, examples of WCD identifiers include NAIs, MDNs, MINs, IMSIs, ESNs, and MEIDs. Any of these types of WCD identifiers, or other data that can be used to identify WCDs, may be used in the "WCD identifier" column of table 600. For purposes of simplicity, entries 602, 604, 606, and 608 contain MDNs (phone numbers) as WCD identifiers, but other types of WCD identifiers may be used instead.

An entry in the "recent visits (calls)" column may be a count of recent visits that the WCD made to the preferred wireless coverage area. Such a visit may entail a WCD registering for service with the preferred wireless coverage area, but not necessarily making any calls in the preferred wireless coverage area. On the other hand, an entry in the recent visits/calls column may be a count of recent calls that the WCD made using resources of the preferred wireless coverage area. Such a call might be a voice call, a data call, or some other type of communication.

An entry in the "recent visits (calls) resulting in rapid handoff" column may be a count of recent visits that the WCD made to the preferred wireless coverage area wherein, during or after these visits, the WCD was handed off to a non-preferred wireless coverage area within a relatively short period of time. Alternatively, an entry in this column may be count of recent calls that the WCD made, using the resources of the preferred wireless coverage area, in which the WCD was handed off to a non-preferred wireless coverage area within a relatively short period of time after call initiation. Preferably, this column measures the same types of event (i.e., calls or visits) that the "recent calls (visits)" column measures.

Regardless of how calls or visits are measured, the "recent visits (calls) resulting in rapid handoff" column may be used to determine how frequently in the past that the WCD with the specified WCD identifier either registered for service with the preferred wireless coverage area and was rapidly handed off, or used resources of the preferred wireless coverage area and was rapidly handed off. If either event or both events occurs frequently, this may indicate that the WCD is likely to be handed off from the preferred wireless coverage area to a non-preferred wireless coverage area.

For example, a WCD may register for service in the preferred wireless coverage area. Whether or not the WCD actually uses any bearer resources of the preferred wireless coverage area, the RAN may record the time of this registration. Accordingly, the RAN may increment the WCD's entry in the "recent visits (calls)" column of table 600. Then, the RAN may determine that the WCD has been handed off to a non-preferred wireless coverage area, and may record the time of the handoff. If the time between these two recorded events is less than a threshold duration (e.g., a few seconds to a few minutes), the RAN may deem the WCD to have been rapidly handed off to a non-preferred wireless coverage area. Therefore, the RAN may increment the WCD's entry in the "recent visits (calls) resulting in rapid handoff" column.

An entry in the "percentage" column of table 600 indicates, for the WCD with the specified WCD identifier, the percentage of recent visits (calls) that were rapidly handed off to a non-preferred, wireless coverage area. Preferably, these entries result from dividing the WCD's entry in the "recent visits (calls) resulting in rapid handoff" by the WCD's entry in the "recent visits (calls)" column.

For instance, in record 602 for WCD identifier 312-555-1000, out of five recent visits (calls), none resulted in such a rapid handoff. Thus, the entry in the "percentage" column is 0%, indicating that the WCD with this identifier is unlikely to be handed off to a non-preferred wireless coverage area in the future. Similarly, in record 606 for WCD identifier 312-555-1002, the entry in the "percentage" column is 10%, also indicating that the WCD with this identifier is unlikely to be handed off to a non-preferred wireless coverage area in the future. On the other hand, the entries in the "percentage"

column for records 604 and 608 are 50% and 100%, respectively. Thus, the WCDs with the identifiers 312-555-1001 and 312-555-1003 are likely to be handed off to a non-preferred wireless coverage area again in the future.

It should be understood that table 600 contains examples of the type of information that a home wireless service provider might use to determine whether a WCD is likely to roam. Thus, table 600 may include more or fewer columns or rows, each containing potentially different information than is shown in table 600. For instance, contents of the "percentage" column could be integer values or non-integer values, or could signify a percentage using other types of representations.

In practice, because of the large number of WCDs that typically subscribe with a given service provider, the size of a roaming-data database, such as table 600, may be quite large. Accordingly, in a further aspect, a switch may pre-load or cache roaming data for WCDs registered in its coverage area. For example, when a WCD registers with the RAN in a coverage area served by a given switch, the switch may look up the roaming data for the WCD in that coverage area. The switch may then store the roaming data for the WCD in local data storage (i.e., data storage located at the switch) so that it is readily available in the event that the switch needs to page the WCD.

While the likelihood of roaming for a given WCD is preferably based on that WCD's roaming data for the coverage area in which the WCD is located, it also possible that the likelihood of roaming may be calculated based upon historical roaming data for all WCDs in a given coverage area. In such an embodiment, the likelihood of roaming for a given WCD may simply be the overall roaming-likelihood indicator for the coverage area in which the WCD is registered. Since the overall roaming-likelihood indicator does not indicate roaming tendency on a per-WCD basis, the overall roaming-likelihood indicator for a given WCD registered in a given coverage area will be the same as for all other WCDs registered in the coverage area.

In addition to the ways of determining the likelihood of roaming for a WCD discussed above, there may be other ways of performing such detection that are in accordance with the embodiments herein. A specific indication of the likelihood of roaming (e.g., handing off from a preferred to a non-preferred coverage area) may be referred to as a "roaming-likelihood indicator". As such, the "percentage" column of table 600 is one example of a roaming-likelihood indicator, and other examples are also possible.

B. Adjustment of Paging-Scheme Settings at a Switch

A switch may adjust various paging-scheme settings, either alone or in combination, based upon the likelihood of a WCD roaming to a non-preferred coverage area. For example, the switch may adjust: (i) one or more of the settings for zone-based paging, (ii) the value of the maximum attempt parameter, (iii) one or more of the settings for intersystem paging, and/or (iv) the duration of the page-attempt timer. It is also possible that other paging-scheme settings may be adjusted in addition to, or in the alternative to, the above-listed settings. A switch may use a variety of techniques, based on the likelihood of a WCD roaming, to determine the one or more paging-scheme settings. Generally, the higher the likelihood of roaming is, the greater the measures taken by a switch in an effort to reduce the likelihood that the WCD will be handed off from the preferred coverage area to the non-preferred coverage area.

In one exemplary embodiment, paging-scheme settings are adjusted in an effort to reduce the probability of a handoff, whenever the likelihood of roaming is greater than a predetermined threshold. However, when the likelihood of roaming is less than the predetermined threshold, the switch may simply use standard paging-scheme settings for the page. FIG. 7 is another flow chart illustrating a method 700, according to an exemplary embodiment, in which the switch compares the determined likelihood of roaming to a predetermined threshold.

As shown in block 702, method 700 involves a switch receiving an incoming call for a WCD that is operating in a preferred coverage area. The switch then determines a value of a likelihood of roaming for the WCD, which in the illustrated embodiment, takes the form of a roaming-likelihood indicator, as shown by block 704. The switch then determines if the value of the roaming-likelihood indicator is greater than the predetermined threshold, as shown by block 706. If the value of the roaming-likelihood indicator is greater than the threshold, then the switch adjusts one or more paging-scheme settings in an effort to reduce the chance that the WCD is handed off to a non-preferred coverage area, as shown by block 708. If, on the other hand, the value of the roaming-likelihood indicator is less than the threshold, then the switch uses standard paging-scheme settings, as shown by block 710. The switch then pages the WCD according to either the at least one adjusted paging-scheme setting or the standard settings (whichever is selected for the page), as shown by block 712.

The value of the roaming-likelihood indicator may take various forms, many of which are described above. To illustrate just one example, the roaming-likelihood indicator may be a percentage representing how often the WCD has been handed off from the preferred wireless coverage area in which it is currently registered, to a non-preferred wireless coverage area operated by another server provider. The threshold may accordingly be the percentage above which the switch adjusts the paging-scheme settings in an effort to increase the chances the mobile successfully receives the page. For instance, the threshold may be set at 95%. Generally, it should be understood that the predetermined threshold may be set as a matter of engineering design choice, and thus may vary according to the desired results and factors considered.

In a RAN that implements zone-based paged, the switch implementing method 700 may adjust settings for zone-based paging based upon the roaming-likelihood indicator. For example, if the roaming-likelihood indicator is greater than the threshold, then the switch may adjust the settings for zone-based paging such that the all attempts to send the page involve system-wide transmission of the page in all zones (i.e., transmission in the entire coverage area served by the switch). Under these settings, every time the switch attempts to send a given page, the switch will send the page to all the BTSs it serves, so that the page is transmitted in all zones covered by the switch. On the other hand, if the roaming-likelihood indicator is less than the threshold, then the switch may use standard settings for zone-based paging, which typically specify that the page should only be transmitted in the zone in which the WCD is registered on the first and second attempt, and only transmitted system-wide, when a third attempt is necessary.

Variations on the above example are also possible. For example, when the roaming-likelihood indicator is greater than the threshold, the switch may still limit the page to the zone in which the WCD is registered on the first attempt, and then expand to system-wide transmission on the second and third attempt. Further, the degree to which the range of a given attempt may be varied. For example, where standard settings may involve sending a page only in the zone in which the WCD is registered, the adjusted settings for the first or second attempt may specify that the WCD be paged in additional zones (zones that are adjacent to the zone in which the WCD is registered, for instance), without necessarily expanding the range of the page to system-wide transmission. Other variations are also possible.

In a further aspect of method 700, the switch may adjust the value of the maximum-attempt parameter based upon the roaming-likelihood indicator. Generally, the manner in which the value of the maximum-attempt parameter is adjusted may vary according to engineering design choice. Preferably, however, the switch increases the value of the maximum-attempt parameter as the likelihood of roaming (and thus the value of the roaming-likelihood indicator) increases. For example, if the roaming-likelihood indicator is greater than the threshold, then the switch may increase the value of the maximum-attempt parameter from the standard setting of three attempts, to four or five attempts for example. Further, the switch may adjust the maximum attempt parameter more granularly. For example, multiple thresholds may be defined for the roaming-likelihood indicator, which each correspond to a different value for the maximum-attempt parameter (typically with the corresponding value of the maximum-attempt parameter increasing as the threshold increases).

And in another aspect of method 700, in a RAN that implements intersystem paging, a switch may adjust settings for intersystem paging based upon the roaming-likelihood indicator. For example, if the roaming-likelihood indicator is greater than the threshold, then the switch may adjust the settings for intersystem paging such that intersystem paging is enabled for all attempts to send the page to the WCD. Under these settings, if the WCD is registered in a border zone, then the switch will begin sending intersystem pages on the first paging attempt, and will do see in each subsequent attempt that is required as well. On the other hand, if the roaming-likelihood indicator is less than the threshold, then the switch may use standard settings for intersystem paging, which typically specify that intersystem paging should only be enabled on the second attempt and any subsequent attempts to send the page.

And in yet another aspect of method 700, a switch may adjust the duration of the page-attempt timer based upon the roaming-likelihood indicator. Generally, the manner in which the roaming-likelihood indicator is used to determine the duration of the page-attempt timer may vary according to engineering design choice. Preferably, however, the switch decreases the duration of the page-attempt timer as the likelihood of roaming (and thus the value of the roaming-likelihood indicator) increases. For example, if the roaming-likelihood indicator is greater than the threshold, then the switch may decrease the duration of the page-attempt timer from a standard setting of, for example, ten seconds, to a duration of five seconds.

Furthermore, when the switch decreases the duration of the page-attempt timer, the switch may do so in conjunction with increasing the value of the maximum-attempt parameter. By doing so the, switch may increase the number of attempts that are made in a given period of time. For example, standard settings specify that a maximum of three attempts can be made, and that the switch should wait ten seconds for a PRM before initiating a subsequent paging-attempt. Therefore, under the standard settings the RAN can make up to three attempts to send the page in a 20-second timeframe. When the roaming-likelihood indicator is greater than the threshold, the switch may set the maximum number of attempts to six, and decrease the duration of the page-attempt timer to four seconds. As such, the switch can now make up to six attempts to send the page in the same 20-second timeframe. It should be understood that this is but one possible combination of settings for the maximum-attempt parameter and page-attempt timer, and many other combinations are also possible.

Furthermore, it should be understood that the above paging-scheme settings may be adjusted alone or in various combinations, based upon the roaming-likelihood indicator. Furthermore, the above description of paging-scheme settings that may be adjusted is not intended to be limiting. Other paging-scheme settings of the switch may also be adjusted, either instead of, or in various combinations with, the above-described paging-scheme settings.

Generally, it should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
a switch in a radio access network (RAN) determining that a wireless communication device (WCD) should be paged, wherein the WCD is operating in a preferred coverage area;
the switch determining a likelihood of roaming for the WCD, wherein the likelihood of roaming indicates the likelihood that the WCD will be handed off from the preferred coverage area to a non-preferred coverage area;
based at least in part on the likelihood of roaming, the switch adjusting at least one paging-scheme setting affecting attempts to page the WCD; and
paging the WCD according to the at least one adjusted paging-scheme setting;
wherein determining the at least one paging-scheme setting of the switch comprises, if the likelihood of roaming is greater than a predetermined threshold, then adjusting the at least one paging-scheme setting in an effort to reduce the likelihood that the WCD will be handed off from the preferred coverage area to the non-preferred coverage area.

2. The method of claim 1, wherein paging the WCD according to the at least one adjusted paging-scheme setting comprises making one or more attempts to page the WCD, wherein each attempt comprises causing one or more base stations to transmit a page to the WCD.

3. The method of claim 1, wherein determining the at least one paging-scheme setting of the switch further comprises:
if the likelihood of roaming is less than the predetermined threshold, then using standard settings.

4. The method of claim 1, wherein determining the likelihood of roaming for the WCD comprises determining an overall roaming-likelihood indicator for the preferred coverage area.

5. The method of claim 1, wherein the switch implements a zone-based paging scheme, and wherein the at least one paging-scheme setting comprises at least one setting of the zone-based paging scheme.

6. The method of claim 5, wherein determining the at least one paging-scheme setting of the switch comprises:
determining whether or not the likelihood of roaming is above a predetermined threshold;
if the likelihood of roaming is above the predetermined threshold, then adjusting the at least one setting of the zone-based paging scheme such that the all attempts to send the page comprise system-wide transmission of the page; and if the likelihood of roaming is below the predetermined threshold, then adjusting the at least one setting of the zone-based paging scheme such that at least a first attempt to send the page comprises transmission only in a zone in which the WCD is registered.

7. The method of claim 1, wherein the at least one paging-scheme setting comprises a maximum-attempt parameter that specifies a maximum number of attempts to send the page that can be made, and wherein determining the at least one paging-scheme setting of the switch comprises:

using the likelihood of roaming as a basis for determining a value of the maximum-attempt parameter; and setting the maximum-attempt parameter equal to the determined value.

8. The method of claim 7, wherein the determined value of the maximum-attempt parameter increases as the likelihood of roaming increases.

9. The method of claim 1, wherein the switch is configured for intersystem paging, and wherein the at least one paging-scheme setting comprises at least one setting for intersystem paging.

10. The method of claim 9, wherein determining the at least one paging-scheme setting of the switch comprises:

determining whether or not the likelihood of roaming is above a predetermined threshold value;

if the likelihood of roaming is above the predetermined threshold, then adjusting the at least one setting for intersystem paging such that intersystem paging is enabled for all attempts to send the page; and if the likelihood of roaming is below the predetermined threshold, then adjusting the at least one setting for intersystem paging such that intersystem paging is disabled on at least a first attempt to send the page.

11. The method of claim 1, wherein the switch is configured to start a page-attempt timer after an attempt to send the page and to make a next attempt to send the page when an acknowledgement from the WCD is not received before the page-attempt timer expires, and wherein determining the at least one paging-scheme setting of the switch comprises using the likelihood of roaming as a basis for determining a duration of the page-attempt timer.

12. The method of claim 11, wherein the determined duration of the page-attempt timer increases as the likelihood of roaming increases.

13. A system comprising:

a non-transitory tangible computer-readable medium;

program instructions stored in the computer-readable medium that are executable by at least one processor to:

(a) determine that a switch in a radio access network (RAN) should page a wireless communication device (WCD), wherein the WCD is operating in a preferred coverage area of the RAN;

(b) determine a likelihood of roaming for the WCD, wherein the likelihood of roaming indicates the likelihood that the WCD will be handed off from the preferred coverage area to a non-preferred coverage area;

(c) if the likelihood of roaming is greater than a predetermined threshold, then adjust the at least one paging-scheme setting is set in an effort to reduce the likelihood that the WCD will be handed off from the preferred coverage area to the non-preferred coverage area, and, if the likelihood of roaming is less than the predetermined threshold, then use standard settings to page the WCD; and (d) cause the switch to page the WCD according to the at least one adjusted paging-scheme setting.

14. The system of claim 13, wherein the system takes the form of a switch comprising the non-transitory tangible computer-readable medium.

15. The system of claim 13, wherein the switch implements a zone-based paging scheme, and wherein the at least one paging-scheme setting comprises at least one setting of the zone-based paging scheme.

16. The system of claim 13, wherein the at least one paging-scheme setting comprises a maximum-attempt parameter that specifies a maximum number of attempts to send the page that can be made.

17. The system of claim 13, wherein the switch is configured for intersystem paging, and wherein the at least one paging-scheme setting comprises at least one setting for intersystem paging.

18. The system of claim 13, wherein the switch is configured to start a page-attempt timer after an attempt to send the page and to make a next attempt to send the page when an acknowledgement from the WCD is not received before the page-attempt timer expires, and wherein the at least one paging-scheme setting of the switch comprises a duration of the page-attempt timer.

19. A method comprising:

a switch in a radio access network (RAN) determining that a wireless communication device (WCD) should be paged, wherein the WCD is operating in a preferred coverage area;

the switch determining a likelihood of roaming for the WCD, wherein the likelihood of roaming indicates the likelihood that the WCD will be handed off from the preferred coverage area to a non-preferred coverage area, wherein the likelihood of roaming is a percentage representing how often the WCD has been handed off from the preferred wireless coverage area operated by a first service provider to a non-preferred wireless coverage area operated by another server provider;

based at least in part on the likelihood of roaming, the switch adjusting at least one paging-scheme setting affecting attempts to page the WCD; and paging the WCD according to the at least one adjusted paging-scheme setting.

* * * * *